United States Patent
Gajendran et al.

(10) Patent No.: US 12,511,159 B2
(45) Date of Patent: Dec. 30, 2025

(54) SYSTEM AND METHOD FOR PROVIDING MAINFRAME RESOURCE UTILIZATION FOR BATCH CYCLE APPLICATION INTEGRATION

(71) Applicant: BANK OF AMERICA CORPORATION, Charlotte, NC (US)

(72) Inventors: Aaron Raja Gajendran, Tamil Nadu (IN); Victor Sims, Plano, TX (US); Sivagurunathan Venkatachalapathy, Tamil Nadu (IN); Matthew Tevnan, Warrington, PA (US); Stanley Michael Rass, Manalapan, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 454 days.

(21) Appl. No.: 18/131,778

(22) Filed: Apr. 6, 2023

(65) Prior Publication Data

US 2024/0338245 A1 Oct. 10, 2024

(51) Int. Cl.
G06F 9/48 (2006.01)
G06F 9/30 (2018.01)

(52) U.S. Cl.
CPC .......... *G06F 9/4881* (2013.01); *G06F 9/3017* (2013.01)

(58) Field of Classification Search
None
See application file for complete search history.

(56) References Cited

U.S. PATENT DOCUMENTS

| | | | |
|---|---|---|---|
| 7,467,198 B2 | 12/2008 | Goodman | |
| 7,552,208 B2 | 6/2009 | Lubrecht | |
| 7,707,015 B2 | 4/2010 | Lubrecht | |
| 7,779,298 B2 | 8/2010 | Challenger | |
| 8,639,653 B2 * | 1/2014 | Linder | G06F 9/4881 707/602 |
| 8,650,225 B2 | 2/2014 | Barrenechea | |
| 8,789,058 B2 * | 7/2014 | Li | G06F 9/4843 718/101 |
| 8,959,067 B1 | 2/2015 | Patiejunas | |
| 9,032,406 B2 | 5/2015 | Eberlein | |
| 9,262,404 B2 | 2/2016 | Ingram | |
| 9,552,401 B2 * | 1/2017 | Bender | G06F 16/24568 |
| 9,612,878 B2 | 4/2017 | Di Balsamo | |
| 9,645,849 B2 * | 5/2017 | Jamjoom | G06F 9/50 |
| 10,223,165 B2 * | 3/2019 | Jamjoom | G06F 9/4881 |
| 10,223,166 B2 * | 3/2019 | Jamjoom | G06F 9/505 |
| 10,241,831 B2 | 3/2019 | Harris | |
| 10,275,281 B2 | 4/2019 | Pradeep | |
| 10,338,956 B2 | 7/2019 | Al-Jarro | |
| 10,419,465 B2 | 9/2019 | Muddu | |

(Continued)

*Primary Examiner* — Van H Nguyen
(74) *Attorney, Agent, or Firm* — Moore & Van Allen PLLC; Nicholas C. Russell

(57) ABSTRACT

Systems, computer program products, and methods are described herein for mainframe resource utilization for batch cycle application integration. The invention generally involves extracting, organizing, and collating batch cycle processing data from various sources, executing data preparation steps, converting file formats, loading data into a designated storage location, generating a mainframe database table with coded date values for predefined batch run dates, and generating a batch job run library by scanning and replacing coded date values with respective date values for predefined batch run dates.

20 Claims, 4 Drawing Sheets

(56) References Cited

U.S. PATENT DOCUMENTS

| | | |
|---|---|---|
| 10,467,569 B2 | 11/2019 | Voss |
| 11,327,788 B2 * | 5/2022 | Bidkar ................ G06F 11/0793 |
| 11,397,744 B2 | 7/2022 | Wan |
| 2009/0171493 A1 | 7/2009 | Govind |
| 2019/0317944 A1 | 10/2019 | Deremigio |
| 2021/0011762 A1 | 1/2021 | Lin |
| 2021/0097691 A1 | 4/2021 | Liu |

* cited by examiner

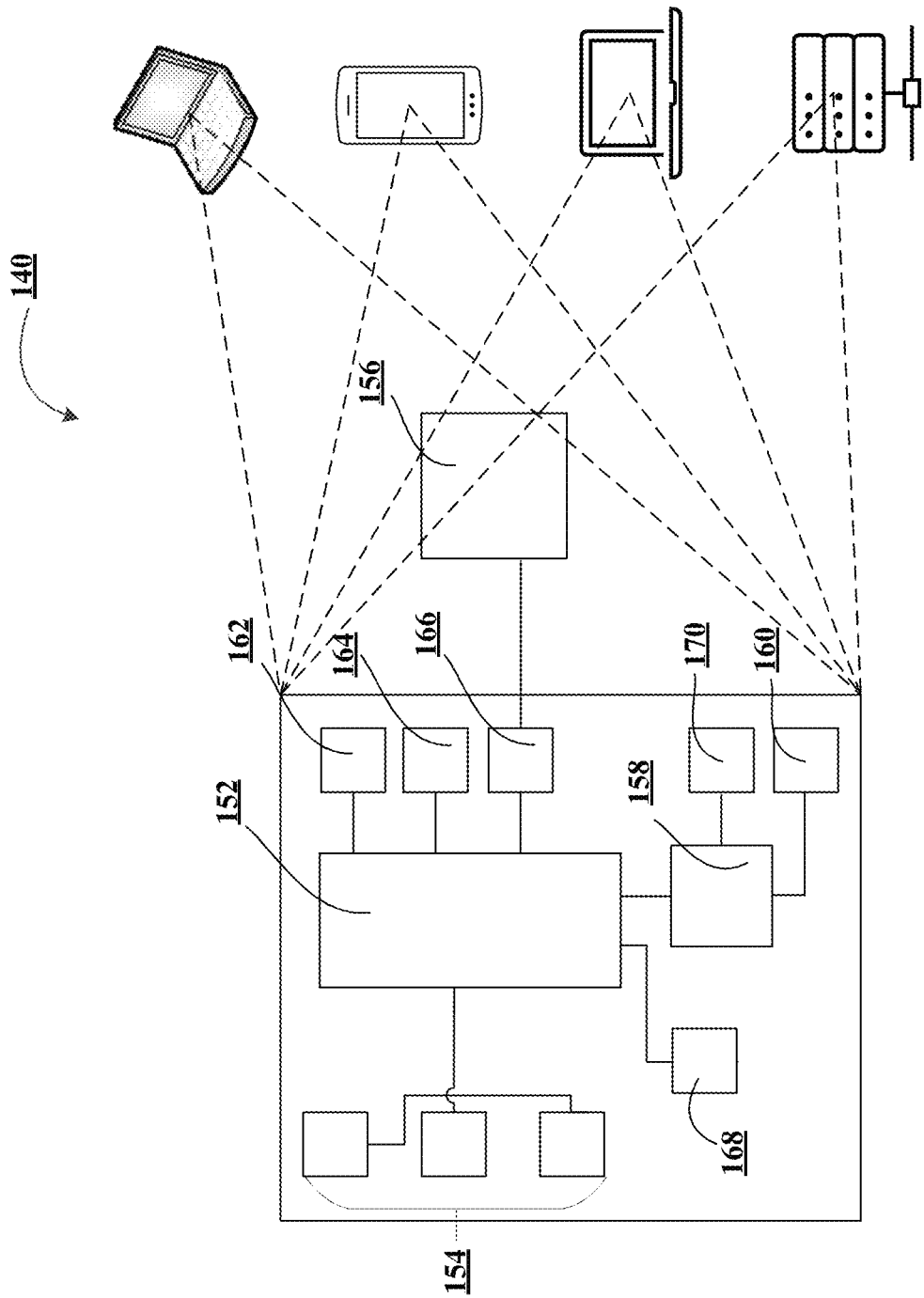

SYSTEM AND METHOD FOR PROVIDING MAINFRAME RESOURCE UTILIZATION FOR BATCH CYCLE APPLICATION INTEGRATION

TECHNOLOGICAL FIELD

Example embodiments of the present disclosure relate to mainframe resource utilization for batch cycle application integration.

BACKGROUND

Having the ability to be agile in order to quickly implement and test mandatory regulatory- and compliance-related changes is an indispensable necessity. Testing, being a critical component of software development lifecycle, also needs to become agile enough to deliver to the market at speed.

While testing mainframe batch applications that depend on numerous upstream and downstream systems/interfaces, the quality of functional, integration, and regression-testing largely rely on being able to simulate the real-time synchronicity in time and data. Creation of past-, current- and future-dated test environment setup to execute mainframe batch cycles with thousands of batch jobs, at will, is largely impossible in conventional systems due to the dependency on the existing scheduler software that are inflexible and rigid. This hinders the testing and hence deters the overall speed to market. Given the need for a flexible batch scheduling system for agile testing without the aforementioned limitations of the scheduling software in the mainframe test environments, the solution to utilize an agile batch cycle generator is being proposed.

Applicant has identified a number of deficiencies and problems associated with mainframe resource utilization for batch cycle application integration. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for mainframe resource utilization for batch cycle application integration.

Batch cycles in enterprise mainframe test environments are scheduled using a scheduler code in batch jobs, which act as symbolic variables representing different dates in various formats. These codes take different values as needed for the functional processing of data by the batch application programs. For example, previous business day, current business day, next business day, previous calendar day, last calendar day of the current month, and so on.

All the mainframe batch jobs that run on the mainframe scheduler take the system date as the batch run date by standard, which is the current calendar/system date, and read a calendar database to decode the code values embedded in the batch job statements for programmatically controlling the input and output dataset names and other parameters/values. Hence, executing a mainframe batch cycle using mainframe scheduler and still being able to provide flexibility of custom run date is not directly possible.

To overcome this limitation, a custom-designed hybrid batch job generation framework of the present system called the Agile Batch Cycle Generator (ABCG) has been developed. This process/tool is configured to access a custom-built mainframe database system loaded with all the coded date values for their respective predefined desired or chosen batch run dates. These values are captured from the calendar database. A mainframe-based automation tool then generates the batch job run library from the original batch jobs by scanning, identifying, and replacing the code with their respective date values for the predefined batch run dates read from the mainframe database table. In addition, a feature to add the run batch job to enterprise source code repository is developed and presented herein, which facilitates copying or moving the agile batch job programs into the backend libraries where the mainframe scheduler can execute these batch jobs from.

The whole process of capturing the code, loading it into the custom-pivotal mainframe database, and generating the agile batch job from a golden copy of the batch job is first performed. Once the agile batch job members are moved into the scheduler batch job library, the batch schedule with a desired cycle date that can be different from the current system date (past, present, or future) is triggered to flexibly test the functionality and integrity of the application programs. It is noted that while the invention provides notable improvements over conventional systems in terms of scheduling flexibility, the invention is not meant to circumvent the formalized mainframe batch scheduling process of any particular entity. Rather, it is designed to individualize testing needs without impacting the greater testing community.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
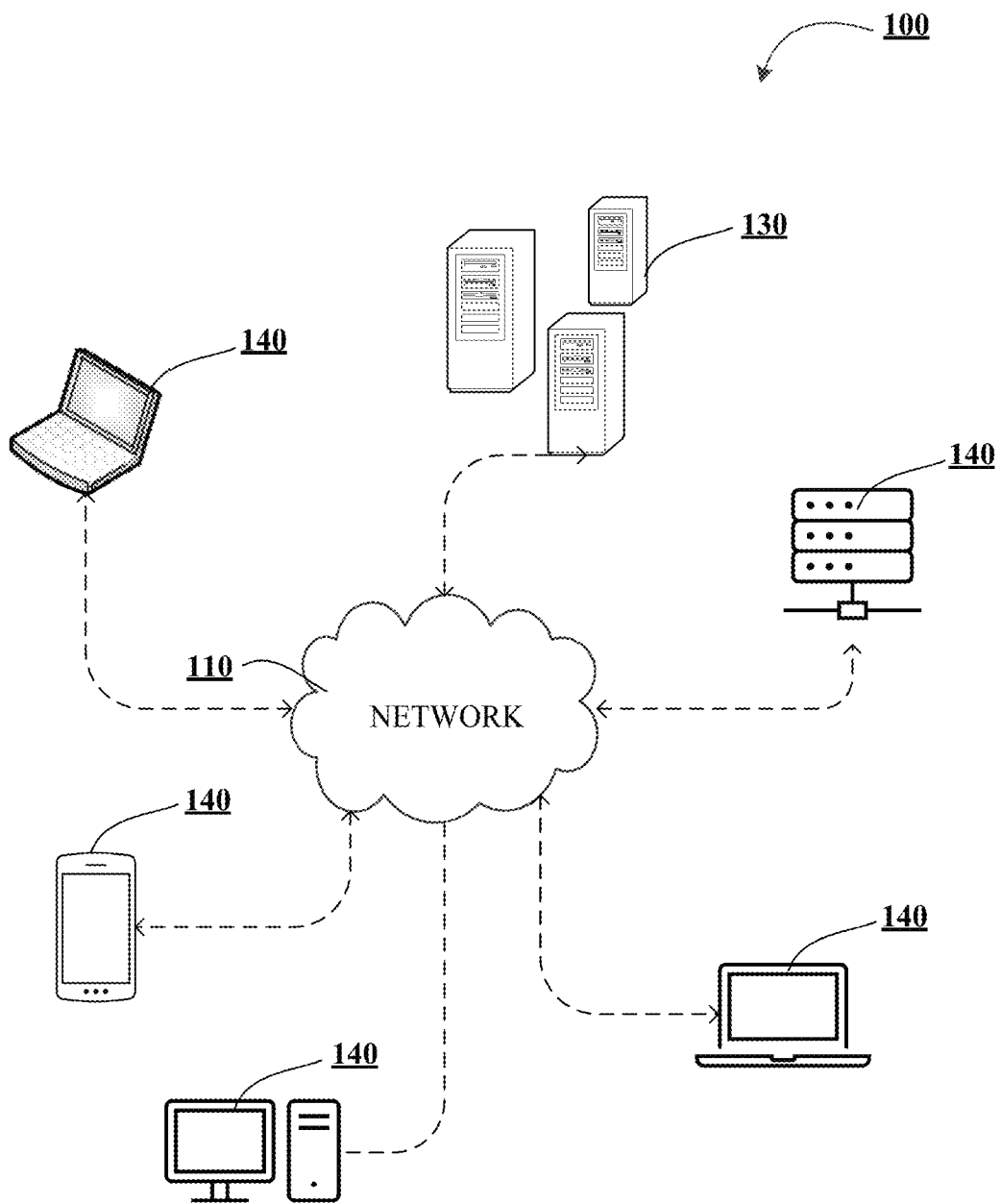
Figure 1B:
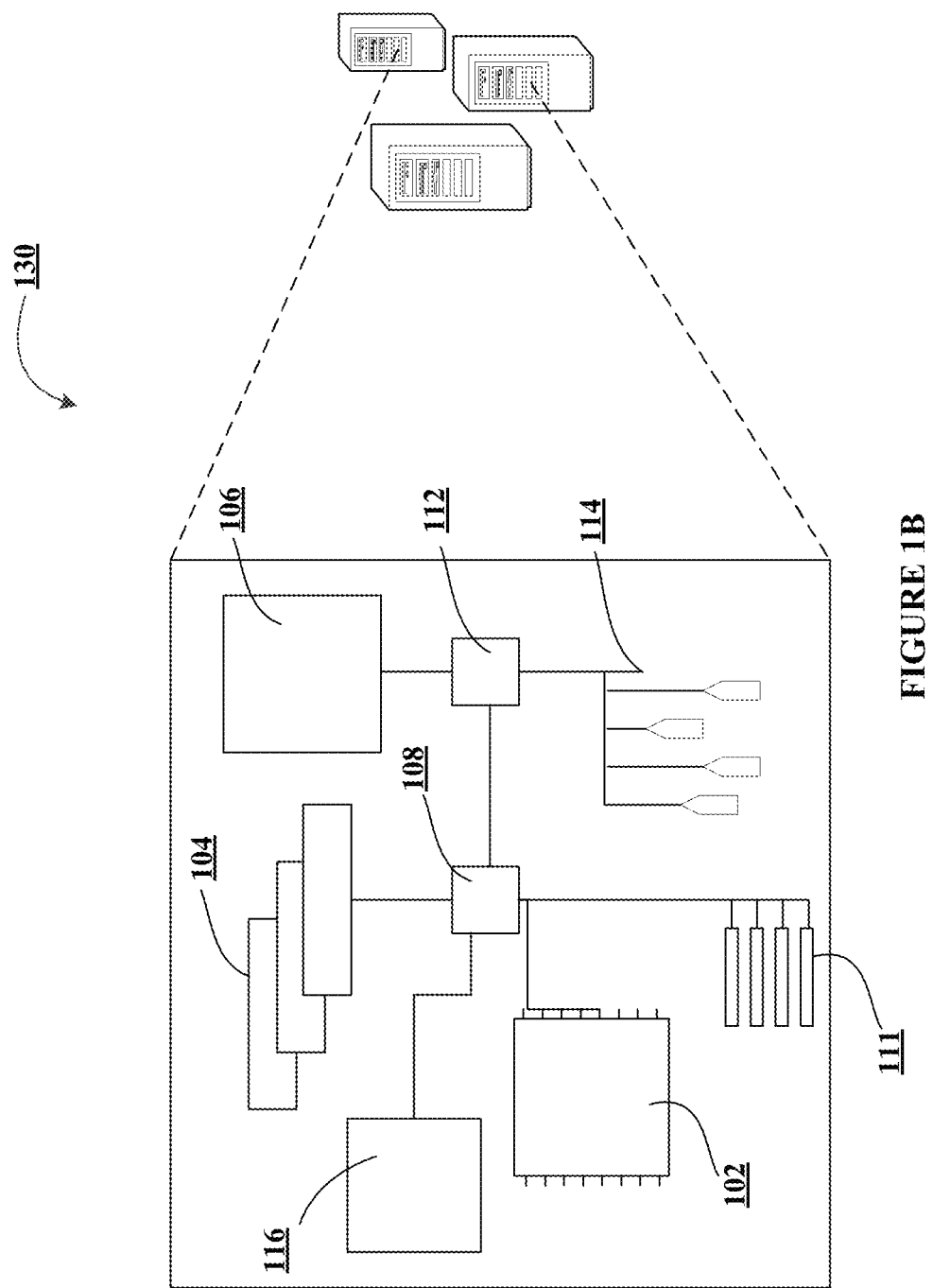
Figure 2:
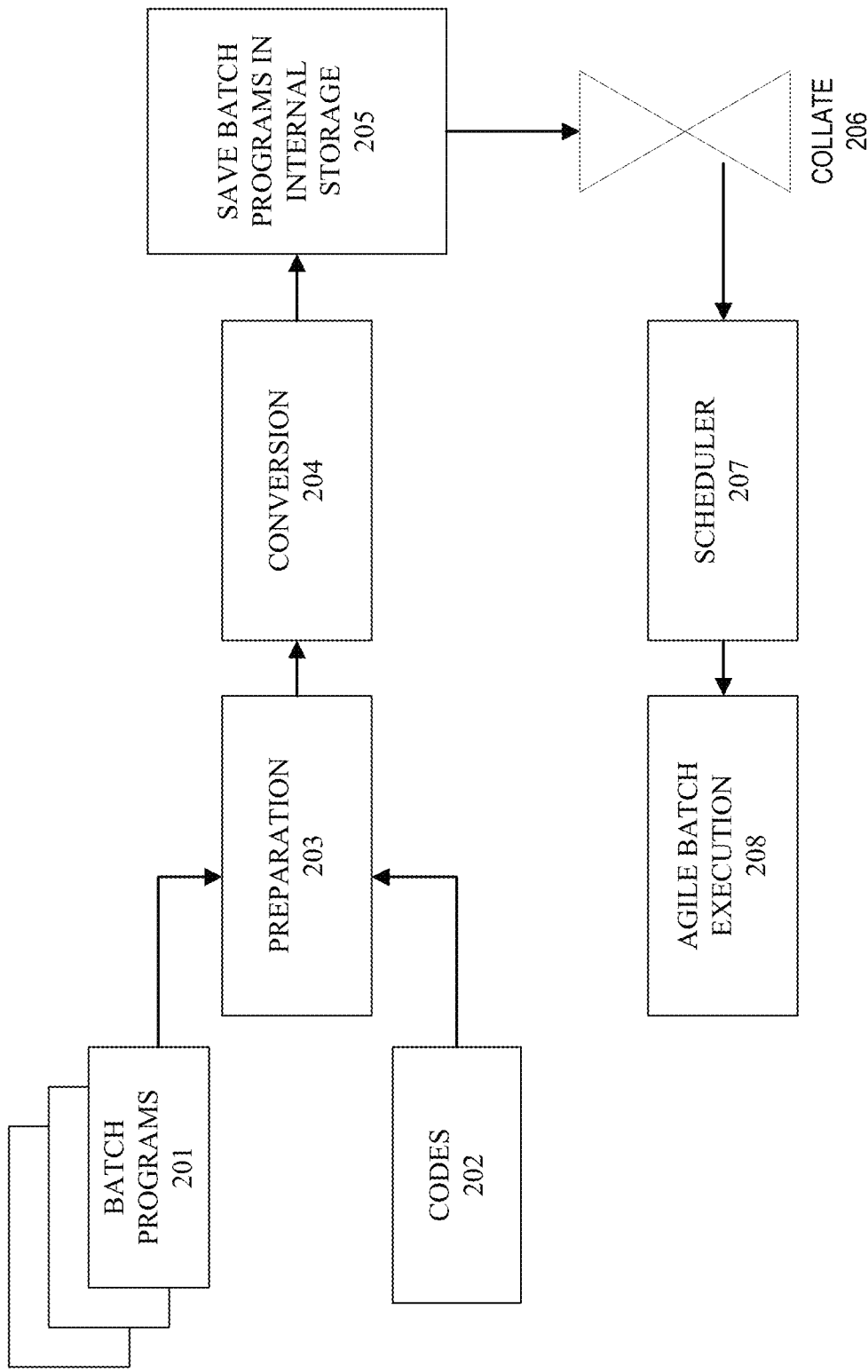

FIGS. 1A-1C illustrates technical components of an exemplary distributed computing environment for mainframe resource utilization for batch cycle application integration, in accordance with an embodiment of the disclosure;

FIG. 2 illustrates a process flow for mainframe resource utilization for batch cycle application integration, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "batch cycle," "batch data cycle," or "batch programming cycle" refers to a process of executing a series of computer programs or tasks on a mainframe computer in a batch mode, where the programs or tasks are run sequentially without user interaction. The batch programming cycle typically includes a sequence of steps, such as job setup, input file processing, program execution, output file generation, and job cleanup. The batch programming cycle may be performed using a batch scheduling system, which generates and manages the execution of batch jobs. The batch programming cycle may also involve the use of symbolic variables to represent different dates or other parameters in the batch jobs, and may require flexibility in date manipulations to carry out the functional aspects of the application in a holistic manner.

As used herein, "batch scheduling system" refers to a computer system or software that manages and controls the execution of a series of computer programs or tasks on a mainframe computer in a batch mode. The batch scheduling system typically receives requests for batch jobs from users or other systems, and schedules the jobs to run on the mainframe computer according to predefined criteria and dependencies. The batch scheduling system may use symbolic variables to represent different dates or other parameters in the batch jobs, and may generate and manage the execution of batch jobs based on a predetermined schedule or set of rules. The batch scheduling system may also monitor the execution of batch jobs, handle errors and exceptions, and generate reports on job status and performance. The batch scheduling system may be implemented as a standalone software application or integrated with other systems, and may include features such as job prioritization, resource allocation, workload balancing, and automated job submission and management.

As used herein, "automation tool" refers to a computer program or software that automates one or more tasks or processes in a computer system. The automation tool may be designed to perform repetitive or complex tasks that would otherwise require manual intervention or programming, and may be used to streamline and optimize various aspects of software development, testing, deployment, and maintenance. The automation tool may use various techniques and technologies, such as scripting languages, APIs, machine learning, and robotic process automation, to automate tasks and interact with other systems and applications. The automation tool may be designed to work with specific software environments or platforms, or may be generic and adaptable to different systems and applications. The automation tool may also include features such as error handling, reporting, and integration with other tools and systems, and may be used to improve the efficiency, accuracy, and reliability of various processes in a computer system.

As used herein, "enterprise mainframe test environments" refer to a collection of hardware, software, and network resources used for testing mainframe computer systems in large enterprises or organizations. The enterprise mainframe test environments typically include one or more mainframe computers, storage systems, network infrastructure, and software applications and tools for testing mainframe applications and systems. The enterprise mainframe test environments may be used for various types of testing, such as unit testing, integration testing, regression testing, and performance testing, and may involve the use of various testing techniques and methodologies. The enterprise mainframe test environments may also involve the use of batch programming cycles, symbolic variables, and other techniques to manage and control the testing process, and may require flexibility in date manipulations to carry out the functional aspects of the application in a holistic manner. The enterprise mainframe test environments may be designed and configured to simulate various scenarios and conditions, such as high loads, failures, and errors, to ensure the reliability, performance, and quality of mainframe applications and systems. The enterprise mainframe test environments may also be integrated with other systems and applications, such as software development tools, test management systems, and deployment systems, to streamline and optimize the testing process and improve the overall software development lifecycle or data analysis lifecycle.

As used herein, "date manipulations" refer to the ability to modify, adjust, or manipulate the date or time values used in computer programs or systems. Date manipulations may include various actions, such as adding or subtracting days, weeks, or months from a given date, converting between different date formats, adjusting for time zone differences, and handling leap years and other calendar anomalies. Date manipulations may be necessary in various contexts, such as software development, testing, and production environments, where the accuracy and correctness of date calculations are critical. Date manipulations may also be required in legacy mainframe systems that use symbolic variables to represent different dates or other parameters in batch jobs, where flexibility in date manipulations is necessary to carry out the functional aspects of the application in a holistic manner. Date manipulations may be performed using various software tools and programming languages, such as COBOL, JCL, or SQL, and may involve the use of specialized functions and libraries for date and time calculations. Date manipulations may also be subject to various rules and constraints, such as rules, requirements, and system limitations, which may require careful validation and testing to ensure accuracy and consistency.

One of ordinary skill in the art will appreciate that having the ability to be agile in order to quickly implement and test mandatory regulatory- and compliance-related changes is an indispensable necessity. Testing, being a critical component of software development lifecycle, also needs to become agile enough to deliver to the market at speed.

While testing mainframe batch applications that depend on numerous upstream and downstream systems/interfaces, the quality of functional, integration, and regression-testing largely rely on being able to simulate the real-time synchronicity in time and data. Creation of past-, current- and future-dated test environment setup to execute mainframe batch cycles with thousands of batch jobs, at will, is largely impossible in conventional systems due to the dependency on the existing scheduler software that are inflexible and rigid. This hinders the testing and hence deters the overall speed to market. Given the need for a flexible batch scheduling system for agile testing without the aforementioned limitations of the scheduling software in the mainframe test environments, the solution to utilize an agile batch cycle generator is being proposed.

Batch cycles in enterprise mainframe test environments are scheduled using a scheduler code in batch jobs, which act as symbolic variables representing different dates in various formats. These codes take different values as needed for the functional processing of data by the batch application programs. For example, previous business day, current business day, next business day, previous calendar day, last calendar day of the current month, and so on.

All the mainframe batch jobs that run on the mainframe scheduler take the system date as the batch run date by standard, which is the current calendar or system date, and read a calendar database to decode the code values embedded in the batch job statements for programmatically controlling the input and output dataset names and other parameters or values. Hence, executing a mainframe batch cycle using mainframe scheduler and still being able to provide flexibility of custom run date is not directly possible.

To overcome this limitation, a custom-designed hybrid batch job generation framework of the present system called the Agile Batch Cycle Generator (ABCG) has been developed. This process or tool is configured to access a custom-built mainframe database system loaded with all the coded date values for their respective predefined desired or chosen batch run dates. These values are captured from the calendar database. A mainframe-based automation tool then generates the batch job run library from the original batch jobs by scanning, identifying, and replacing the code with their respective date values for the predefined batch run dates read from the mainframe database table. In addition, a feature to add the run batch job to enterprise source code repository is developed and presented herein, which facilitates copying or moving the agile batch job programs into the backend libraries where the mainframe scheduler can execute these batch jobs from.

The whole process of capturing the code, loading it into the custom-pivotal mainframe database, and generating the agile batch job from a golden copy of the batch job is first performed. Once the agile batch job members are moved into the scheduler batch job library, the batch schedule with a desired cycle date that can be different from the current system date (past, present or future) is triggered to flexibly test the functionality and integrity of the application programs.

Typically, mainframe batch scheduling systems in large enterprises or organizations has some adaptation of a symbolic variable-based runtime batch job generation process. These systems are tightly coupled and based on system dates stored in a back-end system database. Due to the critical dependencies of the schedulers on their mainframe system, it is improbable to operate batch cycles with the desired level of flexibility when it comes to the date manipulations required to carry out the functional aspects of the application in a holistic manner.

With the advent of agile methodology to speed up time-to-market of new software or application features, developers and testers can make use of agility and flexibility in the testing process. The newly developed system presented herein and associated scheduling process offers flexibility conventional schedulers fail to provide in the legacy monolithic systems that still thrive in information technology. The design of the process caters to changing needs of testing during the software development lifecycle without the need to create another scheduler to execute the batch cycles.

The present invention includes a process that reduces, and in some cases eliminates, dependencies on the system date or timestamp offered by a scheduler, and instead uses the values of codes in batch job programs. Once this dependency is overcome, batch cycle execution becomes flexible to accommodate past-dated, current-dated, and future-dated testing as per the software testing needs, without impacting the existing scheduling mechanism. This invention reduces manual work, which exposes all mainframe batch processes to human error, processing overhead, and associated delays. It also repurposes existing infrastructure to accomplish this task.

Accordingly, the present disclosure relates to a new system which is proposed to address the limitations of batch scheduling systems in enterprise mainframe test environments. The system utilizes an agile batch cycle generator that is configured to access a custom-built mainframe database system loaded with all the coded date values for their respective predefined desired or chosen batch run dates. A mainframe-based automation tool generates the batch job run library from the original batch jobs by scanning, identifying, and replacing the code with their respective date values for the predefined batch run dates read from the mainframe database table. Once the agile batch job members are moved into the scheduler batch job library, the batch schedule with a desired cycle date that can be different from the current system date is triggered to flexibly test the functionality and integrity of the application programs. The new system reduces and, in some cases, eliminates dependencies on the system date or timestamp offered by a scheduler, and instead uses the values of codes in batch job programs, allowing for more flexibility in testing. This invention reduces manual work, processing overhead, and associated delays while repurposing existing infrastructure.

The present disclosure provides a technical solution to a technical problem. As described herein, the technical problem includes the inflexibility of conventional mainframe batch scheduling systems to accommodate past-dated, current-dated, and future-dated testing without impacting the existing scheduling mechanism. The technical solution presented herein allows for a more flexible batch scheduling system for agile testing by utilizing an Agile Batch Cycle Generator (ABCG) to generate batch jobs and schedule them on a desired cycle date that can be different from the current system date. This solution is an improvement over existing solutions to the inflexibility problem, as it reduces the number of steps required to achieve the solution, provides a more accurate solution to the problem, removes manual input and waste from the implementation of the solution, and determines an optimal amount of resources that need to be used to implement the solution. Furthermore, the technical solution described herein uses a rigorous, computerized process to perform specific tasks and activities that were not previously performed, and in specific implementations, the technical solution bypasses a series of steps previously implemented, thus further conserving computing resources.

FIGS. 1A-1C illustrate technical components of an exemplary distributed computing environment 100 for mainframe resource utilization for batch cycle application integration, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

In batch-cycle processing, a large volume of data is processed in batches instead of real-time processing. In some embodiments, the system 130 and the end-point device(s) 140 may have a client-server relationship where the end-point device(s) 140 are remote devices that request and receive service from a centralized server, i.e., the system 130. The system 130 may act as a shared drive, and the processor 102 may process instructions stored in the memory 104 or on the storage device 110 for execution within the system 130 using any subsystems described herein. The storage device 106 is capable of providing mass storage for the system 130, and the high-speed interface 108 manages bandwidth-intensive operations while the low-speed controller 112 manages lower bandwidth-intensive operations. In addition, the system 130 may use multiple processors, memories, and/or I/O devices to execute the processes described herein. The end-point device(s) 140 may communicate with the system 130 through a communication interface 158, which may provide for communications under various modes or protocols, such as the Internet Protocol (IP) suite.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for mainframe resource utilization for batch cycle application integration, in accordance with an embodiment of the disclosure. As shown in blocks 201 and 202, the process begins whereby the system receives data from one or more batch programs as well as code language required for preparation of batch cycle processing. It is understood that the batch cycle processing may include a processor configured to execute a batch cycle program, wherein the batch cycle program is comprised of a sequence of instructions for processing a batch of data. The processor is further configured to receive a batch of data and to perform a series of processing steps on the batch of data according to the batch cycle program. The processing steps may include one or more of the following: sorting the data, filtering the data, transforming the data, aggregating the data, and storing the data. The processor may be connected to a database for storing the batch of data, and the batch cycle program may be executed periodically or in response to a trigger event. The batch cycle processing system may also include one or more user interfaces for configuring the batch cycle program and for monitoring the progress of the batch cycle processing. The system may be implemented as a standalone application or as a module of a larger software system.

As further shown in FIG. 2, the process continues by a preparation step, as indicated in block 203. data preparation refers to the process of preparing and organizing data for input into the batch cycle processing system. This involves several key steps, including data extraction, data cleaning, data transformation, and data loading. The first step in data preparation is data extraction, which involves extracting relevant data from various sources, such as databases, spreadsheets, and text files. The extracted data is then subject to data cleaning, which involves identifying and correcting any errors, inconsistencies, or missing data. Once the data has been cleaned, the next step is data transformation, which involves converting the data into a format that can be processed by the computer system. This may involve converting data from one file format to another or transforming data values to conform to a particular data model or standard, as indicated by block 204. The prepared data is loaded into the system for processing. This involves organizing the data into the appropriate data structures, such as tables or arrays, and loading it into the designated storage location, such as internal storage, as indicated in block 205. The data preparation steps in batch cycle processing are essential for ensuring that the input data is accurate, consistent, and in the appropriate format for processing by the system of the invention.

Next, as shown in block 206, the data may be collated by the system. Collating data is an important step in batch cycle processing as it helps ensure accuracy and consistency of the information being processed. In this step, the data from multiple sources is gathered, organized, and arranged into a standard format for processing. By bringing together data from disparate sources, collation helps identify any discrepancies, errors, or duplications, which can be corrected before processing. The resulting collated data can be used for a variety of purposes, such as generating reports, performing analysis, or feeding downstream processes. Overall, collating data is a crucial step in batch cycle processing that helps ensure the quality and reliability of the final output. As such, a system and method for collating data in batch cycle processing is disclosed. The method comprises the steps of receiving a plurality of input data sets, wherein each input data set comprises data related to a specific aspect of a batch process. The method further comprises sorting the received input data sets based on predetermined criteria and collating the sorted input data sets into a single data set for processing. The system and method additionally comprises executing the batch process on the collated data set, and outputting the processed data in a desired format. This enables efficient processing of large volumes of data by grouping and organizing the data into a single collated data set.

Further indicated in FIG. 2 is the scheduler 207. In batch cycle processing, a scheduler plays a critical role in ensuring that jobs are executed efficiently and effectively. The scheduler allows for the organization of jobs in a logical sequence, thereby reducing the likelihood of conflicts or errors. It is important that the scheduler takes into account the date and time requirements for each job, as well as the dependencies between jobs, to ensure that the overall batch process runs smoothly. The scheduler must be designed to handle job prioritization, resource allocation, and error handling, while also being flexible enough to accommodate changes in the batch processing schedule. By implementing a well-designed scheduler in batch cycle processing, organizations can streamline their operations, reduce errors, and improve overall efficiency.

All the mainframe batch jobs that run on the mainframe scheduler take the system date as the batch run date by standard, which is the current calendar or system date, and read a calendar database to decode the code values embedded in the batch job statements for programmatically controlling the input and output dataset names and other parameters or values. Hence, executing a mainframe batch cycle using mainframe scheduler and still being able to provide flexibility of custom run date is not directly possible using conventional systems.

To overcome this limitation, a custom-designed hybrid batch job generation framework of the present system called the Agile Batch Cycle Generator (ABCG) is presented. This process or tool is configured to access a custom-built mainframe database system loaded with all the coded date values for their respective predefined desired or chosen batch run dates. These values are captured from the calendar database. A mainframe-based automation tool then generates the batch job run library from the original batch jobs by scanning, identifying, and replacing the code with their respective date values for the predefined batch run dates read from the mainframe database table. In addition, a feature to add the run batch job to enterprise source code repository is developed and presented herein, which facilitates copying or moving the agile batch job pro-grams into the backend libraries where the mainframe scheduler can execute these batch jobs from.

The whole process of capturing the code, loading it into the custom-pivotal mainframe database, and generating the agile batch job from a golden copy of the batch job is first performed. Once the agile batch job members are moved into the scheduler batch job library, the batch schedule with a desired cycle date that can be different from the current system date (past, present, or future) is triggered to flexibly test the functionality and integrity of the application programs. It is noted that while the invention provides notable improvements over conventional systems in terms of scheduling flexibility, the invention is not meant to circumvent the formalized mainframe batch scheduling process of any particular entity. Rather, it is designed to individualize testing needs without impacting the greater testing community. As shown in block 208, the overall process concludes by agile batch execution following the scanning, identifying, and replacing the code with their respective date values for the predefined batch run dates read from the mainframe database table. The result is a process which allows for custom values to be input to the agile batch job in order to cause the system to process batch cycle jobs in a predefined, customized order which allows for a more streamlined and efficient use of resources as opposed to conventional systems. For instance, when inputting custom date value for use in batch cycle processing, a user may utilize a terminal to input control layer input in the form of "DXYYDDD1" for instance to signify the particular year (YY) and day (DDD) to be used in the input in the preparation and conversion steps. Once this data is saved by the batch program in internal storage, the data may be collated and scheduled accordingly. In other embodiments, the system of the invention may utilize an intelligent approach to altering data after it has been saved and collated. For instance, the data may already have been prepared for batch cycle processing, but the system of the invention may allow the user to utilize a terminal to input control layer input in order to replace a date value throughout a set of converted and collated data, such that the scheduler will still handle the data as if it was originally scheduled in the intended manner. For instance, the mainframe-based automation tool may generate the batch job run library from the original batch jobs by scanning, identifying, and replacing the code with their respective date values for the predefined batch run dates read from the mainframe database table.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for mainframe resource utilization for batch cycle application integration, the system comprising:
   a processing device;
   a non-transitory storage device containing instructions when executed by the processing device, causes the processing device to perform the steps of:
      extract batch cycle processing data from one or more data sources;
      transmit instructions to execute a data preparation step comprising data cleaning or data error correction;
      transmit instructions to convert one or more data entries of the batch cycle processing data from one file format to another;
      organize the batch cycle processing data into one or more predefined data structures;
      load the batch cycle processing data into a designated storage location;
      collate the batch cycle processing data via arrangement of the batch cycle processing data into a standard processing format;
      generate a mainframe database table loaded with one or more coded date values for respective predefined desired or chosen batch run dates; and
      generate a batch job run library from an original batch job via scanning, identifying, and replacing one or more coded date values with their respective date values for predefined batch run dates read from the mainframe database table.

2. The system of claim 1, wherein the one or more data sources further comprise one or more databases, spreadsheets, or text files.

3. The system of claim 1, wherein converting one or more data entries of the batch cycle processing data further comprises transforming the one or more data entries to conform to a predefined data model or data standard.

4. The system of claim 1, wherein organizing the batch cycle processing data into one or more predefined data structures further comprises arranging the data into one or more tables or arrays.

5. The system of claim 1, wherein data cleaning or data error correction comprises automatic detection and correction of one or more data inconsistencies or missing data values.

6. The system of claim 1, wherein the predefined desired or chosen batch run dates further comprise desired dates that differ from the current system date.

7. The system of claim 6, wherein the predefined desired or chosen batch run dates further comprise a data in the past or future.

8. A computer program product for mainframe resource utilization for batch cycle application integration, the computer program product comprising a non-transitory computer-readable medium comprising code causing an apparatus to:
- extract batch cycle processing data from one or more data sources;
- transmit instructions to execute a data preparation step comprising data cleaning or data error correction;
- transmit instructions to convert one or more data entries of the batch cycle processing data from one file format to another;
- organize the batch cycle processing data into one or more predefined data structures;
- load the batch cycle processing data into a designated storage location;
- collate the batch cycle processing data via arrangement of the batch cycle processing data into a standard processing format;
- generate a mainframe database table loaded with one or more coded date values for respective predefined desired or chosen batch run dates; and
- generate a batch job run library from an original batch job via scanning, identifying, and replacing one or more coded date values with their respective date values for predefined batch run dates read from the mainframe database table.

9. The computer program product of claim 8, wherein the one or more data sources further comprise one or more databases, spreadsheets, or text files.

10. The computer program product of claim 8, wherein converting one or more data entries of the batch cycle processing data further comprises transforming the one or more data entries to conform to a predefined data model or data standard.

11. The computer program product of claim 8, wherein organizing the batch cycle processing data into one or more predefined data structures further comprises arranging the data into one or more tables or arrays.

12. The computer program product of claim 8, wherein data cleaning or data error correction comprises automatic detection and correction of one or more data inconsistencies or missing data values.

13. The computer program product of claim 8, wherein the predefined desired or chosen batch run dates further comprise desired dates that differ from the current system date.

14. The computer program product of claim 13, wherein the predefined desired or chosen batch run dates further comprise a data in the past or future.

15. A method for mainframe resource utilization for batch cycle application integration, the method comprising:
- extracting batch cycle processing data from one or more data sources;
- transmitting instructions to execute a data preparation step comprising data cleaning or data error correction;
- transmitting instructions to convert one or more data entries of the batch cycle processing data from one file format to another;
- organizing the batch cycle processing data into one or more predefined data structures;
- loading the batch cycle processing data into a designated storage location;
- collating the batch cycle processing data via arrangement of the batch cycle processing data into a standard processing format;
- generating a mainframe database table loaded with one or more coded date values for respective predefined desired or chosen batch run dates; and
- generating a batch job run library from an original batch job via scanning, identifying, and replacing one or more coded date values with their respective date values for predefined batch run dates read from the mainframe database table.

16. The method of claim 15, wherein the one or more data sources further comprise one or more databases, spreadsheets, or text files.

17. The method of claim 15, wherein converting one or more data entries of the batch cycle processing data further comprises transforming the one or more data entries to conform to a predefined data model or data standard.

18. The method of claim 15, wherein organizing the batch cycle processing data into one or more predefined data structures further comprises arranging the data into one or more tables or arrays.

19. The method of claim 15, wherein data cleaning or data error correction comprises automatic detection and correction of one or more data inconsistencies or missing data values.

20. The method of claim 15, wherein the predefined desired or chosen batch run dates further comprise desired dates that differ from the current system date.

\* \* \* \* \*